United States Patent
Prytz

(10) Patent No.: US 7,051,511 B2
(45) Date of Patent: May 30, 2006

(54) METHOD AND ARRANGEMENT FOR PREVENTING ENCASED EXPLOSIVES BEING CAUSED TO EXPLODE BY AN EXTERNAL FIRE

(75) Inventor: Alf Prytz, Karlskoga (SE)

(73) Assignee: SAAB AB, Linkoping (SE)

( * ) Notice: Subject to any disclaimer, the term of this patent is extended or adjusted under 35 U.S.C. 154(b) by 126 days.

(21) Appl. No.: 10/312,511

(22) PCT Filed: Jun. 19, 2001

(86) PCT No.: PCT/SE01/01370

§ 371 (c)(1),
(2), (4) Date: Aug. 14, 2003

(87) PCT Pub. No.: WO02/03019

PCT Pub. Date: Jan. 10, 2002

(65) Prior Publication Data

US 2004/0244358 A1  Dec. 9, 2004

(30) Foreign Application Priority Data

Jul. 3, 2000  (SE) .................... 0002504

(51) Int. Cl.
*F02K 25/46* (2006.01)
(52) U.S. Cl. .............. 60/223; 60/770; 239/265.15; 102/377
(58) Field of Classification Search ............. 60/223, 60/770; 239/265.11, 265.15, 265.33, 265.43; 102/377, 481, 378
See application file for complete search history.

(56) References Cited

U.S. PATENT DOCUMENTS

| 3,776,466 | A | * | 12/1973 | Ray ................ 239/265.15 |
|---|---|---|---|---|
| 4,022,129 | A | * | 5/1977 | Day et al. .......... 102/378 |
| 4,084,512 | A |   | 4/1978 | San Miguel |
| 4,272,956 | A | * | 6/1981 | Lamere et al. ......... 60/242 |
| 4,434,614 | A | * | 3/1984 | Gill et al. ............. 60/771 |
| 4,442,666 | A |   | 4/1984 | Vetter |
| 4,458,482 | A |   | 7/1984 | Vetter et al. |
| 4,477,024 | A | * | 10/1984 | O'Driscoll et al. .... 239/265.11 |
| 5,036,658 | A | * | 8/1991 | Tate .................. 60/253 |
| 5,311,820 | A | * | 5/1994 | Ellingsen ............. 102/481 |
| 5,394,803 | A | * | 3/1995 | Mort ................... 102/377 |
| 5,445,077 | A | * | 8/1995 | Dupuy et al. .......... 102/481 |
| 5,540,949 | A | * | 7/1996 | Grover ................ 427/221 |
| 5,735,114 | A | * | 4/1998 | Ellingsen ............ 60/39.1 |

(Continued)

FOREIGN PATENT DOCUMENTS

| FR | 0540418 |   | 5/1993 |
|---|---|---|---|
| FR | 2686410 |   | 7/1993 |
| FR | 2742221 |   | 6/1997 |
| JP | 402216398 | A * | 8/1990 |
| JP | 02003182699 | A * | 7/2003 |

*Primary Examiner*—William H. Rodriguez
(74) *Attorney, Agent, or Firm*—Connolly Bove Lodge & Hutz LLP; Larry J. Hume

(57) ABSTRACT

This disclosure relates to a method and an arrangement for preventing explosives such as rocket engines from exploding while subjected to an external fire in an ammunition bunker. The basic principle underlying the invention is that the casing surrounding the explosive includes a number of parts which are held together by mounting components made from a shape memory alloy, the properties of which are selected in such a manner that these mounting components no longer hold the various parts of the casing together if the surrounding temperature rises to approach the ignition temperature of the explosive in the rocket engine.

3 Claims, 1 Drawing Sheet

U.S. PATENT DOCUMENTS 5,779,151 A * 7/1998 Sutton ................... 239/265.15
5,792,981 A * 8/1998 Singer et al. ............... 102/481
5,841,063 A    11/1998 Hellkvist et al.
5,894,723 A * 4/1999 Gastal ......................... 60/770
6,321,656 B1 * 11/2001 Johnson ..................... 102/377
6,752,085 B1 * 6/2004 Roach ........................ 102/481

* cited by examiner

METHOD AND ARRANGEMENT FOR PREVENTING ENCASED EXPLOSIVES BEING CAUSED TO EXPLODE BY AN EXTERNAL FIRE

BACKGROUND

The present invention relates to a method and an arrangement for, in connection with an external fire in an ammunition bunker, preventing ammunition components stored therein, and then perhaps chiefly rocket engines, from exploding. The invention is based on, in the quantity of explosive enclosed in each ammunition component, before the explosive has reached its ignition temperature as a result of external heating but during the gradual decomposition of the explosive during heating, allowing combustion gases formed in this connection access to a free gas outlet of sufficient cross-sectional area in order to prevent the heating resulting in an explosion. The object of the invention is therefore to limit the damage caused by a fire in the event of external heating of the products concerned here.

The state of the art includes a number of various different proposals with regard to how rocket engines could be prevented from exploding in the event of external fire in, for example, the ammunition bunker where they are stored awaiting use. Several of these earlier proposals are based on making the outer casing of the rocket engines of at least partly temperature-sensitive or fire-sensitive material which, in the event of external fire, will be capable of, from the outside, being weakened sufficiently or being burnt through completely before the propellent powder of the rocket engine has reached its critical ignition temperature. In these older methods as well, the intention is therefore to limit the damage caused by a fire by making sufficient gas outlets available when the gas pressure inside the engine rises to such a great extent that an explosion would otherwise result.

Variants on this subject are described in U.S. Pat. Nos. 4,084,512, 4,442,666 and 4,458,482.

SE-A2-508,650 also describes a method and an arrangement for, with the same intention, preventing an external fire in an ammunition bunker containing fixed artillery ammunition with a charge consisting of what is known as LOVA powder giving rise to an explosion. The burning rate of the LOVA powder is heavily pressure-dependent and, according to this earlier proposal, the cases of the fixed ammunition were therefore provided with weakenings which, when fired in the weapon concerned, cope with the barrel pressure as long as they are supported by the chamber of the weapon but, if they do not have the support of the chamber, break and split open when the internal gas pressure rises above a predetermined value.

The invention concerned here therefore relates to an attempt to solve a previously known problem in a radical new manner. Instead of making use of fire-sensitive outer material in the cases or equivalent enclosing the explosive or of providing the same cases with weakenings made beforehand, we are now proposing making the cases enclosing the explosive in a number of separate parts and assembling these case parts purely mechanically with inserts or mounting components which are made from what are known as shape memory alloys. These inserts or mounting components are also to have such properties that, at a preselected temperature which lies well below the temperature when an explosion is imminent, they eliminate the interconnection between the case parts concerned so that the gas formation which precedes an explosion has a free outlet. In order for this basic principle to be capable of functioning, it is necessary that it is not possible for the mounting components made of shape memory alloy to be heated to their own critical temperature during the burning time of the rocket engine as they will then initiate the safety function built into the invention.

SUMMARY

The shape memory alloys, of which there quite a number and which all actually consist of various alloys which may be based on nickel-titanium or hafnium-palladium or a number of other metals, can be imparted very precise temperature-defined deformations. These deformations, which are built into the metal during manufacture of the component, may involve contraction or expansion of 4–8% but also direct built-in pure deformations, and it is possible to define relatively accurately beforehand at which temperature these are to take place. The built-in deformation temperature of the shape memory alloy and whether the deformation involves expansion or contraction is defined by controlling the alloying materials and the alloying contents and in the manufacturing process itself, and the manufacturing process also makes it possible to define even the actual shape the component concerned will have after initiation of the deformation of the shape memory alloy. The principle is that, at temperatures above the critical temperature, the shape memory alloy recovers the shape and dimensions it once had before it was imparted a different shape by various processing operations. If, on the other hand, its temperature should fall below the critical temperature, its shape and dimensions then revert to those the component had before heating. It may sometimes also be advantageous for it to be possible to return to the original shape by virtue of a temperature reduction, and this is possible because, when the change takes place, it therefore lasts only as long as the temperature lies above the critical transformation temperature. In the context of the present invention, however, it is primarily the first transformation step which is relevant. The change which takes place at the critical temperature involves a return to an original state which the shape memory alloy component had before it was transformed by virtue of various procedures into the state which subsequently applies as long as its temperature does not exceed the critical temperature. In principle, the shape memory alloy component has an unlimited storage time provided it does not reach its critical temperature.

The method of producing the connection component made of shape memory alloy which is characteristic of the invention does not form part of the invention and will therefore not be discussed in greater detail below either. On the other hand, it would not constitute any great problem for a person with the requisite knowledge within the shape memory alloy field to produce the connection components necessary for implementation of our invention.

The invention has been defined in greater detail in the patent claims below and will now be described somewhat further in connection with the accompanying figures.

BRIEF DESCRIPTION OF THE DRAWINGS

FIG. 1 shows a longitudinal section through a rocket launch engine with a short burning time, while

Figure 1:
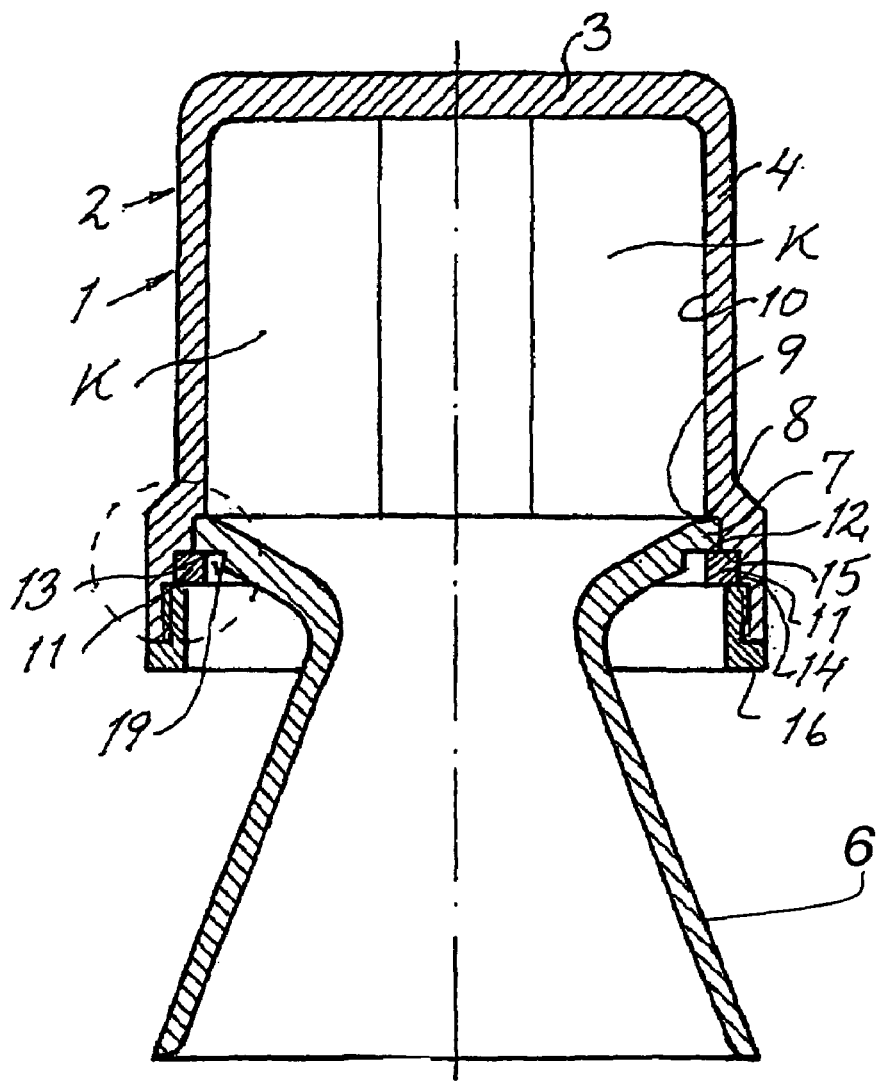
Figure 2:
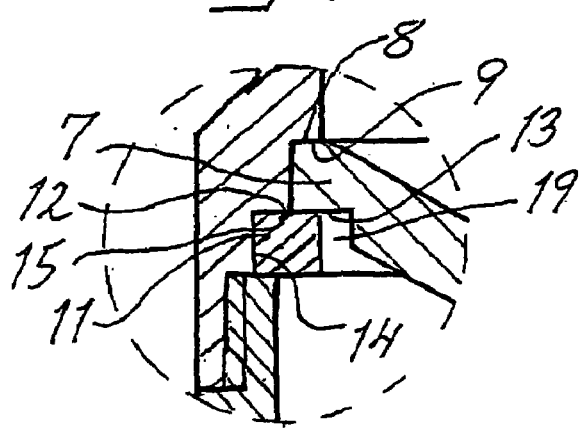
FIG. 2 shows a detail from FIG. 1 on larger scale.

The rocket engine 1 according to the figure consists of a powder chamber 2 which is in the form of a cylindrical pot with a plane bottom 3 and continuous side walls 4 and contains propellent powder K. In the initially open other end 5 of the powder chamber 2, a rocket outlet nozzle 6 is inserted into a stop position intended for it, in which its outer flange edge 7 bears with its inwardly facing broad side 8 against a stop edge 9 adapted thereto in the inner wall 10 of the powder chamber. The rocket outlet nozzle 6 is then held in place by a ring 11 made of shape memory alloy which is arranged outside the flange edge 7 and bears with an inner flank 12 against the outer broad side 13 of the flange edge 7. The shape memory alloy ring 11 is in turn fixed in a locking groove 14 in the inner wall 10 of the powder chamber 2. This locking groove 14 is then in turn formed between an inner outwardly facing stop edge 15 and a stop ring 16 screwed into the outwardly facing opening of the powder chamber.

It is also the case that the maximum diameter of the flange edge 7 is not greater than can pass through the stop ring 16, and that there is a space 19 available between the inner edge of the locking ring 11 and the rocket outlet nozzle 6 which allows the inner diameter of the locking ring 11 to contract sufficiently in order for it to fall out of the locking groove 14 and to be capable of, together with the flange edge 7 of the rocket outlet nozzle 6, passing the locking ring 16. According to the invention, this contraction function has therefore been built into the ring 11 by virtue of the latter having been manufactured of a shape memory alloy adapted thereto which accordingly activates the contraction function at a predetermined temperature which lies well below the ignition temperature of the propellent powder K. If the ring 11 is heated to the critical transformation temperature of the shape memory alloy, this contraction of the ring consequently takes place, the rocket engine nozzle 6 then no longer being firmly connected to the powder chamber 2, as a result of which its entire cross-sectional area becomes available as a gas outlet, and what would otherwise have been an explosion is replaced by a powder fire, which can be serious enough but never as devastating as an explosion.

DETAILED DESCRIPTION

The rocket engine 1 according to the figure consists of a powder chamber 2 which is in the form of a cylindrical pot with a plane bottom 3 and continuous side walls 4 and contains propellant powder K. In the initially open other end of the powder chamber 2, a rocket outlet nozzle 6 is inserted into a stop position intended for it, in which its outer flange edge 7 bears with its inwardly facing broad side 8 against a stop edge 9 adapted thereto in the inner wall 10 of the powder chamber. The rocket outlet nozzle 6 is then held in place by a ring 11 made of shape memory alloy which is arranged outside the flange edge 7 and bears with an inner flank 12 against the outer broad side 13 of the flange edge 7. The shape memory alloy ring 11 is in turn fixed in a locking groove 14 in the inner wall 10 of the powder chamber 2. This locking groove 14 is then in turn formed between an inner outwardly facing stop edge 15 and a stop ring 16 screwed into the outwardly facing opening of the powder chamber.

It is also the case that the maximum diameter of the flange edge 7 is not greater than a diameter that can pass through the stop ring 16, and that there is a space 19 available between the inner edge of the locking ring 11 and the rocket outlet nozzle 6 which allows the inner diameter of the locking ring 11 to contract sufficiently in order for it to fall out of the locking groove 14 and to be capable of, together with the flange edge 7 of the rocket outlet nozzle 6, passing the locking ring 16. According to the invention, this contraction function has therefore been built into the ring 11 by virtue of the latter having been manufactured of a shape memory alloy adapted thereto which accordingly activates the contraction function at a predetermined temperature which lies well below the ignition temperature of the propellant powder K. If the ring 11 is heated to the critical transformation temperature of the shape memory alloy, this contraction of the ring consequently takes place, the rocket engine nozzle 6 then no longer being firmly connected to the powder chamber 2, as a result of which its entire cross-sectional area becomes available as a gas outlet, and what would otherwise have been an explosion is replaced by a powder fire, which can be serious enough but never as devastating as an explosion.

The invention claimed is:

1. A rocket engine arrangement suitable for preventing a premature ignition of the rocket engine and an external fire in an ammunition bunker containing said rocket engine, the arrangement comprising:
    a casing containing a propellant powder therein;
    a plurality of parts held together by mounting components,
    said mounting components each comprising a shape memory alloy,
    wherein a stop edge of a first one of said mounting components contacts a flange edge of one of the plurality of parts at least during a normal use and burning time of the rocket engine so as to hold the plurality of parts together,
    wherein a transformation temperature of the shape memory alloy is selected to be less than an ignition temperature of the propellant powder,
    wherein, when heated to a transformation temperature by combustion gases formed during a gradual heating of the propellant powder before an ignition thereof, a shape of each of the mounting components is such that the plurality of parts are no longer held together by the mounting components, but instead are deformed by expansion or contraction relative to each other, and
    wherein the mounting components are configured in the rocket engine arrangement such that it is never possible for the shape memory alloy to reach a critical temperature thereof during the normal use and burning time of the rocket engine.

2. The arrangement of claim 1, further comprising a stop ring in contact with a face of the first one of said mounting components, wherein the stop ring is connected to the casing.

3. A rocket engine arrangement suitable for preventing a premature ignition of the rocket engine and an external fire in an ammunition bunker containing said rocket engine, the arrangement comprising:
    a casing containing a propellant powder therein;
    a plurality of parts held together by mounting components,
    said mounting components each comprising a shape memory alloy,
    wherein a transformation temperature of the shape memory alloy is selected to be less than an ignition temperature of the propellant powder,
    wherein when heated to a transformation temperature by combustion eases formed during a gradual heating of the propellant powder before an ignition thereof, a shape of each of the mounting components is such that the plurality of parts are no longer held together by the mounting components, but instead are deformed by expansion or contraction relative to each other, and wherein the mounting components are configured in the rocket engine arrangement such that it is never possible for the shape memory alloy to reach a critical temperature thereof during a normal use and burning time of the rocket engine,
wherein the casing comprises:
a container which is closed on sides and at least one end wall thereof;
a rocket engine nozzle which is guidable down into the container and there bears, along an inwardly facing outer edge, against an inner stop edge arranged in a container wall to limit a movement of the rocket engine nozzle into the container,
wherein said rocket engine nozzle is held in place by a mounting component comprising a locking ring,
said locking ring, in an original position, bearing against an outer side of the rocket engine nozzle along the outer edge thereof and holding the rocket engine nozzle pressed against the inner stop edge of the container,
said locking ring entering a locking groove arranged in the container wall and, when the locking ring is in place, fixes its own position in the container and also a position of the rocket engine nozzle in the container,
wherein the internal diameter dimension of the locking groove is selected such that the rocket engine nozzle is free to pass in and out of the container when the locking ring is no longer in place in the locking groove,
wherein the locking ring comprises the shape memory alloy which, at a selected critical temperature which is lower than the ignition temperature of the propellant powder, contracts to an original outer dimension which allows the locking ring to come out of the locking groove and to pass out of the container.

* * * * *